US006372819B1

(12) United States Patent
Mizobuchi et al.

(10) Patent No.: US 6,372,819 B1
(45) Date of Patent: Apr. 16, 2002

(54) METHOD OF MARKING A SUBSTRATE

(75) Inventors: Yoshikazu Mizobuchi, Mundelein; Jamice C. Adams, Richton Park, both of IL (US)

(73) Assignee: Marconi Data Systems Inc., Wood Dale, IL (US)

( * ) Notice: Subject to any disclaimer, the term of this patent is extended or adjusted under 35 U.S.C. 154(b) by 0 days.

(21) Appl. No.: 09/665,356

(22) Filed: Sep. 19, 2000

Related U.S. Application Data

(62) Division of application No. 09/234,509, filed on Jan. 21, 1999, now Pat. No. 6,133,342.

(51) Int. Cl.[7] .................................................. C09D 11/00

(52) U.S. Cl. ........................ 523/161; 427/181; 430/346; 430/348

(58) Field of Search ......................... 523/161; 427/181; 430/346, 348

(56) References Cited

U.S. PATENT DOCUMENTS

| | | | |
|---|---|---|---|
| 4,179,305 | A | 12/1979 | Miller |
| 4,571,416 | A | 2/1986 | Jarzombek et al. |
| 4,605,686 | A | 8/1986 | Obana |
| 4,612,049 | A | 9/1986 | Berner et al. |
| 4,680,332 | A | 7/1987 | Hair et al. |
| 4,861,620 | A | 8/1989 | Azuma et al. |
| 4,880,465 | A | 11/1989 | Loria et al. |
| 4,880,466 | A | 11/1989 | Zwarum et al. |
| 4,980,390 | A | 12/1990 | Shorr et al. |
| 5,486,550 | A | 1/1996 | Lubas |
| 5,596,027 | A | 1/1997 | Mead et al. |
| 5,662,731 | A | 9/1997 | Andersen et al. |
| 5,679,145 | A | 10/1997 | Andersen et al. |
| 5,711,791 | A | 1/1998 | Croker et al. |
| 5,760,120 | A | 6/1998 | Itoh et al. |
| 5,792,856 | A | 8/1998 | Allen et al. |
| 5,821,286 | A | 10/1998 | Xu et al. |
| 5,830,929 | A | 11/1998 | Stramel |
| 5,868,824 | A | 2/1999 | Andersen et al. |
| 5,897,938 | A | 4/1999 | Shinmoto et al. |
| 5,990,199 | A | 11/1999 | Bealing et al. |
| 6,013,724 | A | 1/2000 | Mizutani et al. |
| 6,025,077 | A | 2/2000 | Yamaki et al. |

FOREIGN PATENT DOCUMENTS

| | | |
|---|---|---|
| DE | 19652253 | 6/1998 |
| EP | 0 485 181 | 5/1992 |
| EP | 0 739 933 A1 | 10/1996 |
| GB | 2291719 | 1/1996 |
| JP | 02 162544 | 6/1990 |
| JP | 03 124051 | 5/1991 |
| JP | 03 130942 | 6/1991 |
| JP | 05 162449 | 6/1993 |

OTHER PUBLICATIONS

"Laser–sensitive Pitmente im Kunststoff", *Austropak,* pp. 10–12 (1997).

Translation of BB ("Laser–sensitive Pitmente im Kunststoff", *Austropak,* pp. 10–12 (1997)).

*Primary Examiner*—Bernard Lipman
(74) *Attorney, Agent, or Firm*—Leydig, Voit & Mayer, Ltd.

(57) ABSTRACT

The present invention provides a laser markable coating composition comprising a colorant and a polymeric material whose opacity changes substantially irreversibly when exposed to heat. The composition may further include a carrier, an adhesion promoter, an energy transfer agent, an opaque polymeric material, and one or more binder resins. The present invention further provides a heat responsive colorant particle comprising a colorant and a polymeric material whose opacity changes substantially irreversibly when exposed to heat. A laser beam can be used to provide the heat. An example of a suitable polymeric material that irreversibly changes in opacity is a styrene/acrylic microsphere. An example of a suitable colorant is carbon black pigment. An example of an energy transfer agent is fumed silica. An example of an adhesion promoter is an oxidized polyethylene. An example of a suitable carrier is water. The coating composition offers advantages such as the ability to mark substrates at high line speeds and without creating dust or residues. The surface of the marked substrate is smooth.

3 Claims, 2 Drawing Sheets

(2 of 2 Drawing Sheet(s) Filed in Color)

METHOD OF MARKING A SUBSTRATE

This is a divisional of application No. 09/234,509, filed on Jan. 21, 1999, now U.S. Pat. No. 6,133,342, issued Oct. 17, 2000, the disclosure of which is incorporated herein in its entirety.

TECHNICAL FIELD OF THE INVENTION

The present invention is related to heat sensitive coating compositions in general, and in particular, to an opaque coating composition whose opacity decreases irreversibly when exposed to a source of heat such as a laser beam, and a related method of marking substrates with a laser beam.

BACKGROUND OF THE INVENTION

High speed laser beam marking or coding of commercial products, for example, metal cans and plastic products, is a growing area of great interest and offers certain advantages over conventional marking technologies which are generally afflicted with one or more drawbacks. For example, marking by ink jet printing requires frequent maintenance to keep the nozzle from clogging. Further, the use of fluids such as ink jet inks containing solvents in contact with the printed surface cannot be tolerated in certain critical applications for reasons related to safety and compatibility.

In view of the foregoing, laser beam marking systems have received a significant attention from the industry. See, for example, European Patent Application 0 739 933 A1, UK Patent Application GB 2291719 A, and U.S. Pat. Nos. 5,760,120 and 4,861,620. Laser beam marking has the advantage that a fluid is not employed in the marking process. The laser beam marking systems can also be operated with minimal maintenance requirements. However, systems known heretofore suffer from certain shortcomings. For example, in some systems, a polymeric molded product containing a laser sensitive pigment is marked by irradiating with a laser beam. The laser beam creates a mark by evaporating or pyrolyzing the polymeric resin, and, as a result, exposing the pigment. See, e.g., European Patent Application 0 739 933 A1 and U.S. Pat. No. 5,760,120. Such a system, however, can leave behind dust or residues as the polymer material is ablated from the surface of the product. Further, in the above method, since the polymer is etched by the laser beam, the surface of the product is uneven, and, therefore, lacks smoothness.

Thus, there exists a need for a laser marking system that does not create or leave behind dust or residue during marking. There further exists a need for a laser marking system that leaves a relatively smooth surface. There further exists a need for a system that offers a broad range of color contrast. There further exists a need for a system that is amenable in a variety of colors. There further exists a need for a laser marking system that can mark at high speeds, for example, at about 300 feet/minute or higher.

These and other objects of the present invention will be apparent from the detailed description of the preferred embodiments of the invention set forth below.

SUMMARY OF THE INVENTION

The foregoing needs have been fulfilled to a great extent by the present invention which provides a heat responsive colorant particle comprising a colorant and a polymeric material whose opacity changes substantially irreversibly when exposed to heat. The present invention further provides a heat markable coating composition comprising a colorant and a polymeric material whose opacity changes substantially irreversibly when exposed to heat. A laser beam can be used to provide the heat. Preferably, the opacity of the polymeric material decreases as a result of exposure to heat and the colorant becomes more visible.

The present invention further provides a method for marking a substrate with a laser beam, the method comprising applying to the substrate the heat markable coating composition to provide a coated substrate and irradiating selected areas of the coated substrate with a laser beam. The present invention further provides a method for preparing a coated substrate suitable for laser marking comprising:

(a) providing a substrate;

(b) coating the substrate with a composition comprising a colorant, a first binder resin, and a first carrier to provide a first coated substrate; and (c) coating the first coated substrate with a composition comprising a polymeric material whose opacity changes substantially irreversibly when exposed to heat, a second binder resin, and a second carrier to obtain the coated substrate.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENTS

Figure 1:
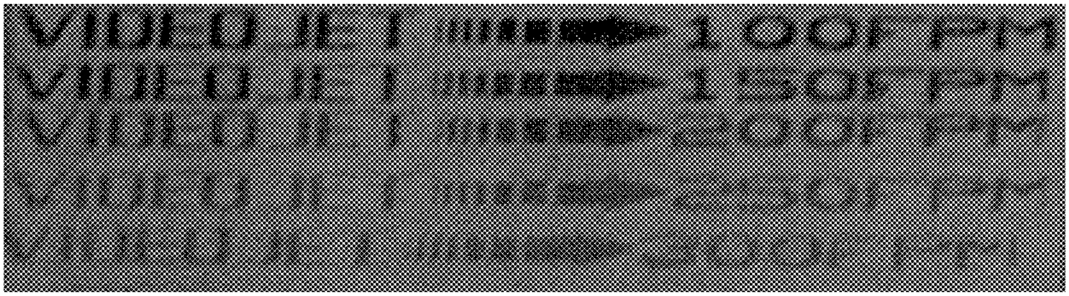
FIG. 1 depicts a photograph of the laser coding obtained on a substrate coated with the laser markable coating composition of the present invention.

The present invention is predicated on a concept that a colorant that has been concealed by a polymeric material can be exposed by changing the opacity of that polymeric material. Thus, for example, a colorant that has been concealed or covered by an opaque polymeric material can be made visible by decreasing the opacity of the polymeric material.

The opacity of the polymeric material can be changed by providing a suitable energy, for example, heat, to the polymeric material. Thus, a substrate coated with a composition comprising a concealed colorant can be subjected to a source of energy, for example, a heat beam. Upon irradiating the substrate with a laser beam according to a predetermined marking pattern, the polymeric material undergoes a change, for example, melts or undergoes a glass transition, whereby the opaque polymeric material becomes translucent or transparent. As a result, the colorant is made visible, and a visible mark is created on the substrate. Accordingly, the present invention provides a heat responsive colorant particle comprising a colorant and a polymeric material whose opacity changes irreversibly or substantially irreversibly when exposed to heat. The present invention further provides a heat markable coating composition, preferably an opaque coating composition, comprising a colorant and a polymeric material whose opacity changes, preferably decreases, irreversibly or substantially irreversibly when subjected to heat. A detailed description of the inventive heat responsive colorant particle and the coating composition are set forth below.

The heat responsive colorant particle comprises a colorant and a polymeric material. Preferably, the heat responsive colorant particle further includes an adhesion promoter.

Any suitable colorant, pigment, dye, or lake, can be used to prepare the heat responsive colorant particle. A pigment is preferred. Organic or inorganic pigments can be used. An example of a suitable pigment is carbon black. The colorant can have any suitable particle size, for example, from about 0.05 $\mu$m to about 10 $\mu$m, and preferably, the colorant has a size of from about 0.1 $\mu$m to about 1 $\mu$m.

Any polymeric material that changes in opacity irreversibly or substantially irreversibly when exposed to heat, preferably one whose opacity decreases, can be used. The change in opacity can result from any type of, chemical, physical, or combination thereof, change in the polymeric material. The change in the polymeric material is preferably one that does not involve evaporation or pyrolysis, which is often accompanied by the breakage of the covalent bonds between the monomer units. Thus, for example, the change in opacity can result from a physical change such as the melting or glass transition of the polymeric material as it is irradiated with a laser beam. An opaque polymeric material is physically changed and solidifies as a less opaque material when it cools. Thus, thermoplastic polymeric materials are preferred. The polymeric material can be in any suitable physical form. Thus, for example, the polymeric material can be a powder or a sphere. Microspheres are particularly preferred. The microspheres can be filled, e.g., beads, or they can be hollow. Hollow microspheres are further preferred. Any suitable microsphere known to those of skill in the art can be used; see, e.g., U.S. Pat. No. 4,880,465, column 3, lines 38–52, the disclosure of which is incorporated herein by reference. The microsphere can have any suitable size, preferably, an outside diameter of from about 0.1 $\mu$m to about 10 $\mu$m. If the outside diameter is less than about 0.1 $\mu$m, light scattering properties of the microspheres deteriorate significantly. If the outside diameter is greater than about 10 $\mu$m, the microsphere does not efficiently cover or conceal the colorant. Typically, microspheres are available in the outside diameter range of from about 1 $\mu$m to about 5 $\mu$m.

In embodiments wherein the polymeric material changes in opacity as a result of physical change, the polymeric material has a melting point or glass transition temperature of from about 70° C. to about 300° C., preferably from about 100° C. to about 250° C., and more preferably from about 130° C. to about 200° C.

An example of a suitable microsphere is ROPAQUE™ OP-96 Emulsion, available from Rohm & Haas Co. in Philadelphia, Pa. ROPAQUE OP-96 Emulsion is a water based emulsion having a pH of 8.0–9.0 and contains styrene/acrylic copolymer microspheres. This styrene/acrylic copolymer has free carboxyl groups. The styrene/acrylic copolymer has a Tg of about 100° C. This microsphere is particularly suitable for preparing water based coating compositions. Another example of a suitable microsphere is JONREZ™ OPX-7369-81, which is a water based emulsion of acrylic copolymer microsphere having free carboxyl groups and is available from Westvaco Chemical Division in Charleston Heights, S.C. This microsphere has a Tg of about 100° C.

The heat responsive colorant particle preferably includes an adhesion promoter for providing sufficient adhesion between the colorant and the polymeric material, particularly in situations where the density of the polymeric material is less than that of the colorant. Any suitable adhesion promoter can be employed. A preferred class of adhesion promoters includes polymers which possess polar and nonpolar segments, e.g., hydrophilic and hydrophobic functional segments. It is believed that, in certain embodiments, the adhesion promoter has a greater proportion of hydrophobic segments than hydrophilic segments. Thus, for example, oxidized polyethylenes can be used as adhesion promoters. A preferred oxidized polyethylene is AC™ 656 from AlliedSignal, Inc., in Morristown, N.J.

The heat responsive colorant particle can have any suitable proportions of the colorant, adhesion promoter, and the polymeric material. Thus, the colorant can be present in an amount of up to about 30%, preferably from about 10% to about 25%, and more preferably from about 12% to about 20% by weight of the heat responsive colorant particle. The adhesion promoter can be present in an amount of up to about 30%, preferably from about 5% to about 25%, and more preferably from about 10% to about 20% by weight of the heat responsive colorant particle. The polymeric material can be present in an amount of up to about 90%, preferably from about 50% to about 80%, and more preferably from about 60% to about 75% by weight of the heat responsive colorant particle.

The heat responsive colorant particle can be prepared by combining the colorant and the polymeric material in any suitable manner known to those of ordinary skill in the art. A preferred method is set forth below. The microspheres are preferably adjusted to have reduced hydrophilicity. This can be carried out as follows. The microspheres are suspended in a sufficient quantity of water and the pH of the water is adjusted to be about 1 to about 3, and preferably 2. The pH adjustment is desired to convert any carboxylate groups to carboxyl (free acid) groups. The pH adjustment can be carried out by the addition of an acid, for example, hydrochloric acid. After equilibrium is reached at the desired pH, the microspheres can be recovered, e.g., by filtration, and dried to remove the water preferably completely. The resulting product can be pulverized, e.g., in a coffee grinder, to obtain dried, pH adjusted microspheres.

A known quantity of the colorant, e.g., carbon black, is suspended in a suitable medium, e.g., water in a vessel equipped with a mixer. The suspension is mixed and heated to an elevated temperature, preferably above 50° C., and more preferably to a temperature of from about 60° C. to about 95° C. A known quantity of the adhesion promoter, e.g., oxidized polyethylene, is added to the suspension and the mixing is continued. After a short period of time, of approximately 5 minutes to about 10 minutes, a known quantity of the polymeric material, e.g., pH adjusted microspheres, are added to the mixture above and the stirring continued, preferably at a higher speed than before. After mixing for a period of time sufficient to ensure uniform coverage and dispersion at the elevated temperature, the mixture is allowed to cool to ambient temperature (20–25° C.) and is recovered, e.g., by filtration. The recovered material is dried in an oven to remove the residual water, and pulverized, e.g., in a coffee grinder, to obtain an embodiment of the heat responsive colorant particles of the present invention.

The heat responsive colorant particles of the present invention can be applied to a substrate as such, or preferably, as a coating composition that includes, in addition to the heat responsive colorant particles, a carrier, one or more binder resins, and an energy transfer agent.

Any suitable carrier, organic or aqueous, can be used to prepare the coating composition of the present invention. Water is preferred as the carrier since it is harmless to the environment.

The binder resin improves the quality of the coating on the substrate, e.g., the cohesion of the heat responsive colorant particles and its adhesion to the substrate. Any suitable binder resin known to those skilled in the art can be employed. An example of a suitable binder resin is an acrylic polymer, preferably a water soluble one. An example of a commercially available aqueous solution of an acrylic polymer is AP™-4050, from Lawter International, Inc., in Northbrook, Ill.

The energy transfer agent serves to improve the conversion of the energy supplied during marking of the substrate to heat. Thus, where a laser energy beam is used to create the mark, the energy transfer agent absorbs the laser beam energy and emits it as heat energy. The energy transfer agent is typically a solid filler that has a light absorption in the infrared region. The energy transfer agent has a particle size of less than about 10 $\mu$m, preferably from about 0.01 $\mu$m to about 5 $\mu$m. Examples of suitable energy transfer agents include fumed silica such as AEROSIL™ 300, fumed alumina such as ALUMINUMOXID™ C, and a combination thereof such as AEROSIL COK, all available from Degussa Corp. in Ridgefield, N.J. Optionally, the polymeric material such as ROPAQUE OP-96 Emulsion, can be additionally included in the coating formulation to increase the contrast between the marked or coded portions and the background or non-coded potions by giving the background a lighter hue or appearance.

The coating composition can contain the heat responsive colorant particles, the carrier, the binder resin, and the energy transfer agent in any suitable proportions. In addition, the coating composition may additionally include a polymeric material, preferably an tonically active polymeric resin. For example, the heat responsive colorant particles are present in an amount of from about 1% to about 15%, preferably in an amount of from about 2% to about 10%, and more preferably in an amount of from about 3% to about 8% by weight of the coating composition; the carrier is present in an amount of from about 40% to about 90%, preferably in an amount of from about 50% to about 80%, and more preferably in an amount of from about 60% to about 70% by weight of the coating composition; the binder resin is present in an amount of from about 10% to about 40%, preferably in an amount of from about 15% to about 30%, and more preferably in an amount of from about 20% to about 25% weight of the coating composition; and the energy transfer agent is present in an amount of up to about 10%, preferably in an amount of from about 0.1% to about 5%, and more preferably in an amount of from about 0.1% to about 3% by weight of the coating composition. The additional polymeric material, ionically active polymeric resin, is present in an amount of up to 20%, preferably in an amount of from about 0.1% to about 15%, and more preferably in an amount of from about 5% to about 10% by weight of the coating composition.

The coating composition can be prepared by methods known to those of ordinary skill in the art. Certain preferred methods are illustrated below.

The desired quantities of the binder resin, preferably as its solution, the polymeric material, preferably microspheres, the carrier, preferably de-ionized water, the energy transfer agent, preferably fumed silica, and the heat responsive colorant particles are combined in a suitable container and mixed thoroughly, for example, by shaking with 2 mm diameter steel balls in a paint shaker. When the mixing is complete, the resulting composition is filtered to remove any impurities such as large particles and air bubbles.

Alternatively, the coating composition can be prepared as follows. The desired quantities of the colorant, the binder resin(s), the energy transfer agent, the polymeric material, preferably microspheres, and optional additives such as a defoamer, evaporation speed controlling agent, viscosity control agent, and/or rub resistance enhancing agent, such as wax, are combined and mixed to obtain a coating composition.

The coating composition can be applied to the substrate by methods known to those skilled in the art. A conventional air spray coating equipment can be used to apply the coating. Other methods such as dip coating and slip casting are also available. After the substrate has been coated, the coating is dried initially at room temperature, followed by drying at an elevated temperature, for example, 80° C., for about 4 hours. The wet thickness of the coating can be from about 2 $\mu$m to about 200 $\mu$m, preferably from about 5 $\mu$m to about 100 $\mu$m, and more preferably from about 20 $\mu$m to about 20 $\mu$m. The dry thickness of the coating can be from about 0.1 $\mu$m to about 20 $\mu$m, preferably from about 1 $\mu$m to about 10 $\mu$m, and more preferably from about 1 $\mu$m to about 5 $\mu$m.

In certain embodiments, the coating composition can be applied in two stages. In the first stage, a composition comprising the colorant, the binder resin, and the carrier is prepared by combining and mixing the ingredients, and the composition is applied to the substrate. In the second stage, a composition comprising a binder resin (same or different than the binder resin in the first stage composition), the polymeric material, the energy transfer agent, and the carrier is prepared as before and applied to the substrate on top of the first coating. The coated substrate is dried as described above.

Figure 2:
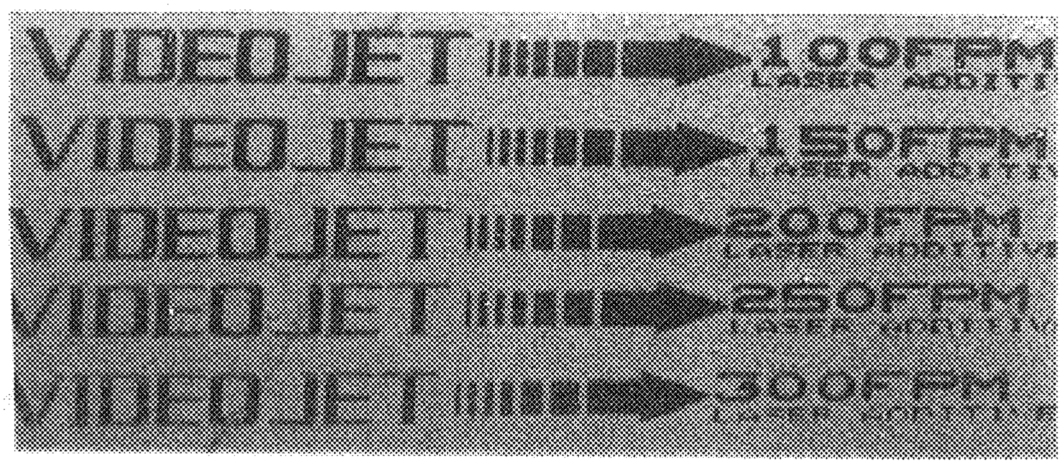
FIG. 2 depicts a photograph of the laser coding obtained on a substrate coated with another laser markable coating composition of the present invention.

The coating composition of the present invention can be applied to a variety of substrates such as metal, glass, ceramic, wood, cardboard, paper, and plastic substrates. FIGS. 1–2 depict the marking made on the coating composition on a metal substrate, specifically aluminum substrate. The coating composition is particularly suitable for application on metal substrates, for example, aluminum and steel substrates.

The coated substrates can be marked with any suitable source of heat, preferably with a laser beam. Any suitable laser that can act as a heat source can be used, for example, a $CO_2$ laser and an YAG laser. An example of a suitable marking system is VIDEOJET LASERPRO™ DM which is a sealed $CO_2$ 100 Watt laser system, available from Videojet Systems International, Inc. Substrates to be marked or coded can be advanced at high rates, for example, from about 50 feet/minute to about 500 feet/minute. A coding speed of about 300 feet/minute or higher is generally desired by the marking industry.

The laser coded or marked substrates can be evaluated for color contrast by methods known to those skilled in the art. For example, the color densities of the coded and non-coded areas can be measured by using a densitometer such as the Model RD918 densitometer from GretagMacbeth Co. in Newburg, N.Y.

The contrast factor, (Di–Db)/Db, can be calculated from the density of the coded area (Di) and the density of the non-coded area (Db). Marks or codes that are visually acceptable have a contrast factor of 0.3 or greater, and, accordingly, this is the target contrast factor for most marking applications.

The coating composition of the present invention offers one or more of the following advantages. It provides an opportunity for high speed marking of substrates. The coatings are highly sensitive to laser marking. The coatings have heat stability, durability, and abrasion resistance. The coatings can be marked with high contrast. The contrast can be varied to any desired degree relatively easily, e.g., by adjusting the laser power or duration of irradiation. The coating composition is relatively easily prepared and applied. The coating composition is versatile and offers a great choice of colors. Coding or marking can be carried out with minimal dust or residue formation. The coatings can be easily removed from substrate surfaces by common cleaning agents such as caustic solution.

The following examples further illustrate the present invention, but, of course, should not be construed as in any way limiting its scope.

EXAMPLE 1

This Example illustrates the preparation of the heat responsive colorant particles of the present invention.

The emulsion of opaque particles in water, ROPAQUE OP-96, approximately 500 grams, and 500 grams of de-ionized water were placed in a 3-liter beaker and the mixture was stirred by a magnetic stir bar. Conc. HCl aqueous solution was slowly added into the mixture with stirring until the pH of the mixture was about 2, as indicated by a pH paper. The acid treated mixture was filtered on a filter paper, and the filter cake was washed with de-ionized water on the filter paper. The resulting filter cake was dried in an oven at 100° C. until all the water was removed. The resulting opaque particle cake was pulverized in a coffee grinder. The acid treatment helps reduce the hydrophilic property of the opaque particles by the de-ionization.

96.8 grams of AJACK BLACK 5021, a carbon black slurry in water containing 12.4 wt % of carbon black and available from Solution Dispersions, Inc. in Cynthiana, Ky., were placed along with 260 grams of de-ionized water in a 1 liter stainless steel container equipped with a mixer from Premier Mill Corp. (Laboratory Dispersator, Model 90, with 1.5 inches blades) and a heater. The slurry was heated to approximately 90° C. with stirring at the speed of 1500 rpm. 12 grams of AC 656, an oxidized polyethylene from AlliedSignal, Inc., were mixed into the slurry with stirring at the same speed and heating condition. After about 2 minutes, the stirring speed was increased to 4000 rpm and the mixture was maintained in that condition for about 10 minutes. 48 grams of the acid treated, dried opaque particles prepared as above, were mixed into the slurry at the same stirring speed. The mixture was stirred for 5 more minutes. At this point, the heater was removed from the container while maintaining the stirring speed at 4000 rpm, and about 200 mL of water were added to the slurry to reduce its temperature. The resulting slurry was filtered, and the modified pigment was dried in air overnight and then in an oven at 50° C. for 4 hours. The resulting pigment was pulverized in a coffee bean grinder. The particles thus prepared exhibited a response. The particles turned from opaque light gray to translucent black on a glass plate when exposed to heat at above 180° C. for 1 minute in an oven.

EXAMPLE 2

This Example illustrates the need for an adhesion promoter in modifying carbon black pigment particles with styrene/acrylic copolymer microsphere. The same procedure described in Example 1 was followed except no AC 656 was used. The particles that resulted were dark black, thereby confirming that the pigment particles were not concealed by the microspheres.

EXAMPLE 3

This Example illustrates the preparation of a coating composition of the present invention. Fifty grams of aqueous acrylic polymer solution, AP-4050, from Lawter International, Inc., 22.5 grams of opaque polymeric microspheres in water, ROPAQUE OP-96, 18 grams of de-ionized water, 2 grams of fused silica, AEROSIL 200, from Degussa, 7.5 grams of the heat responsive particles prepared as in Example 1, and 80 grams of steel balls (diameter: approx. 2 mm) were placed in an 8 oz. glass jar, and the jar was tightly closed by a screw cap. The jar was shaken by using a paint shaker from Red Devil for about 20 minutes. The resulting fluid was filtered through a mesh with 100-mesh size to remove any large particles and air bubbles. The resulting fluid was suitable for coating on substrates.

EXAMPLE 4

This Example illustrates another way of formulating a coating composition of the present invention. One hundred grams of an aqueous slurry of carbon black, AJACK BLACK 5021, 40 grams of JONCRYL 91, 0.2 gram of XRM 3588E, 20 grams of JONCRYL 617, 20 grams of JONWAX 28, 50 grams of propylene glycol, 5 grams of AEROSIL 200, and 250 grams of ROPAQUE OP-96 were placed in a 1 liter stainless steel container equipped with an air mixer (1.5 inches blades), and the mixture was stirred at a speed of about 300 rpm for 30 minutes at room temperature. The resulting composition was found to be suitable for coating on a substrate.

EXAMPLE 5

This Example illustrates another method of preparing the coating composition of the present invention. The coating composition was a two part system. 50 grams of acrylic polymer, AP-4050, 5 grams of carbon black, ELFTEX™ 8 from Cabot Corp. in Billerica, Mass., and 18 grams of de-ionized water were mixed in a container to obtain the first part.

50 grams of AP-4050, 29.5 grams of ROPAQUE OP-96, 0.5 grams of AEROSIL 200, and 20 grams of de-ionized water were combined and mixed to obtain the second part. The two parts were placed separately along with 80 grams of steel balls in 8 oz glass jars, and the jars were sealed tight with screw caps. The jars were then shaken in a paint shaker for about 20 minutes, and the resulting fluids were filtered through a 100-mesh filter. The first was applied to the substrate and after the coating dried, the second part was applied. The substrate was dried to obtain a coated substrate suitable for laser marking.

EXAMPLE 6

This Example illustrates the effect of an energy transfer agent on the laser marking ability of the coating composition of the present invention. AEROSIL 200 was used as the energy transfer agent. Four coating compositions (Sample #1–3 and Control) were prepared as in Example 3; Sample #1–3 included heat responsive particles prepared as in Example 1 and the Control included heat responsive particles prepared as in Example 2; and sample #1 and Control did not contain AEROSIL 200. The ingredients of the compositions are set forth in Table 1.

TABLE 1

| Ingredient | Formulation of coating fluid involving laser and heat responsive particles | | | |
|---|---|---|---|---|
| | Sample #1 | Sample #2 | Sample #3 | Control |
| AF-4050 | 50 grams | 50 grams | 50 grams | 50 grams |
| ROPAQUE OP-96 | 17.5 grams | 23.5 grams | 22.5 grams | 22.5 grams |
| Deionized Water | 25 grams | 18 grams | 18 grams | 20 grams |
| AEROSIL 200 | 0 grams | 1 gram | 2 grams | 0 grams |
| Heat responsive particle from Example 1 | 7.5 grams | 7.5 grams | 7.5 grams | 7.5 grams |

The above compositions were coated on aluminum panels. The coated panels exhibited coding response to a 100 W $CO_2$ laser beam as shown in Table 2. The coding speed was 100 feet/min.

TABLE 2

| Effect of AEROSIL 200 on the quality of the laser marking | | | |
|---|---|---|---|
| Sample # | AEROSIL 200 | Contrast Factor | Db |
| 1 | 0 gram | 0.388 | 0.67 |
| 2 | 1 gram | 1.178 | 0.56 |
| 3 | 2 grams | 0.788 | 0.52 |
| Control | 0 gram | 0.259 | 1.08 |

As can be seen from the data obtained, the composition samples, except the control, are capable of providing coatings on aluminum panels and that the coatings can be coded with high contrast, for example, dark black coded image on a light gray background. It is further evident that a combination of the heat responsive colorant particles and AEROSIL 200 increased the contrast factor of coded image. It also reduced the background (non-coded area) color density. On the other hand, the control sample, which did not include an energy transfer agent and which included a heat responsive particle free of an adhesion promoter, produced a low contrast factor and high background color density.

EXAMPLE 7

This Example illustrates the effect of the substrate on coding efficiency. Sample #3 from Example 6 was coated on aluminum and steel panels. The coding speed was 100 feet/minute. The contrast factor and background color density obtained are set forth in Table 3. FIG. 1 depicts a photograph of the laser coding obtained from this sample.

TABLE 3

| Dependency of contrast factor on substrate at 100 feet/min of coding speed | | |
|---|---|---|
| Material of Panel | Contrast Factor | Db |
| Aluminum | 0.788 | 0.52 |
| Steel | 1.038 | 0.52 |

It is clear that steel, with higher heat capacity than aluminum, offered a greater contrasting coding than aluminum.

EXAMPLE 8

This Example illustrates another embodiment of the coating composition of the present invention wherein an organic pigment is used as the colorant. Organic pigments, Pigment Blue 15:3, Pigment Red 122, or Pigment Yellow 74, was used as the colorant and heat responsive particles and coating compositions were prepared as set forth in Examples 1–2. The ingredients and the amounts are set forth in Table 4.

TABLE 4

| Organic pigment formulations | |
|---|---|
| Ingredient | Weight (grams) |
| Pigment dry weight | 6.0 |
| Deionized Water | 394.0 |
| AC 656 | 4.8 |
| Dried Opaque Particles | 30.0 |

The heat responsive particles prepared were used in preparing coating compositions. The coating compositions are set forth in Table 5.

TABLE 5

| Coating compositions employing organic pigments | |
|---|---|
| Ingredient | Weight (grams) |
| AP-4050 | 50.0 |
| ROPAQUE OP-96 | 22.5 |
| Deionized Water | 20.0 |
| Heat Responsive Particles | 7.5 |

The compositions were coated by spray coating on steel panels, and the coding responsiveness was evaluated. The results obtained are shown in Table 6.

TABLE 6

| Responsiveness of coating compositions to $CO_2$ laser at 100 feet/minute of coding speed | | |
|---|---|---|
| Sample # (Color) | Contrast Factor | Db |
| 4 (Pigment Blue 15:3, Cyan) | 0.243 | 0.74 |
| 5 (Pigment Red 122, Magenta) | 0.367 | 0.49 |
| 6 (Pigment Yellow 74, Yellow) | 0.441 | 0.77 |

The colored films on steel panels exhibited good responsiveness to 100 W $CO_2$ laser.

EXAMPLE 9

This Example illustrates the advantages of a two part system (Example 5) over the one part system (Example 4). Sample #7 was prepared as in Example 4 and sample #8 was prepared as in Example 5. The coating compositions were coated on aluminum panels and their responsiveness to laser coding was studied. The results obtained are set for in Table 7. The laser coding was carried out at a speed of 100 feet/minute. FIG. 2 depicts a photograph of the laser coding that was obtained from sample #7.

TABLE 7

Evaluation of contrast factor on alternative coatings

| Sample # | Contrast Factor | Db |
|---|---|---|
| 7 (One part system) | 1.175 | 0.74 |
| 8 (Two part system) | 3.200 | 0.10 |

The foregoing clearly shows that both the systems are suitable for producing good contrast factors. The two part or double fluids coating system offers an even greater contrast factor and lower background color density. The coating produced by sample #8 was thicker that produced by sample #8; the enhanced contrast factor is believed to be partially due to this greater thickness.

EXAMPLE 10

This Example illustrates the effect of coding speed on the quality of the coding produced on the coating composition of the present invention. A typical coding speed of the CO2 laser in industries is about 300 feet/minutes. Results on the evaluation of coding speed are shown in Table 8.

TABLE 8

Dependency of contrast factor on coding speed

| Coding Speed Feet/Minutes | Sample #3 (Aluminum Panel) | Sample #3 (Steel Panel) | Control | Sample #7 (Aluminum Panel) |
|---|---|---|---|---|
| 50 | 1.115 | 1.153 | 0.157 | 1.243 |
| 100 | 0.788 | 1.038 | 0.259 | 1.175 |
| 150 | 0.557 | 0.884 | 0.222 | 1.081 |
| 200 | 0.442 | 0.750 | 0.185 | 1.013 |
| 250 | 0.326 | 0.673 | 0.138 | 0.986 |
| 300 | 0.288 | 0.423 | 0.120 | 0.864 |
| 350 | 0.230 | 0.307 | 0.092 | 0.783 |
| 400 | 0.192 | 0.250 | 0.074 | 0.675 |
| 450 | 0.173 | 0.211 | 0.055 | 0.635 |
| 500 | 0.153 | 0.192 | 0.055 | 0.445 |

The targeted contrast factor is about 0.3 when color density of the background is more than about 0.3. If the background is completely white, that is, if its color density is below 0.15, it would be necessary to set another targeted number for the contrast factor. The foregoing clearly shows that both Sample #3 on aluminum and steel panels met the industrial requirement of the coding speed (300 feet/minutes). Sample #7 exceeded this requirement. On the other hand, as expected, the control did not show enough sensitivity to the $CO_2$ laser, since the control had high background color density. As indicated above, an energy transfer agent is often needed with pigments such as carbon black to increase the $CO_2$ laser marking or coding speed.

The references cited herein, including patents, patent application, and publications, are hereby incorporated by reference in their entirety.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. A method for marking a substrate with a heat beam, said method comprising applying to the substrate a heat markable coating composition comprising a colorant and a polymeric material whose opacity changes substantially irreversibly when exposed to heat to provide a coated substrate and irradiating selected areas of the coated substrate with a heat beam.

2. The method of claim 1, wherein the heat markable coating composition includes one or more binder resins and an energy transfer agent.

3. A method for preparing a coated substrate suitable for heat marking comprising:

(a) providing a substrate;

(b) coating the substrate with a composition comprising a colorant, a first binder resin, and a first carrier to provide a first coated substrate; and (c) coating the first coated substrate with a composition comprising a polymeric material whose opacity changes substantially irreversibly when exposed to heat, a second binder resin, and a second carrier to obtain said coated substrate.

* * * * *

UNITED STATES PATENT AND TRADEMARK OFFICE

CERTIFICATE OF CORRECTION

PATENT NO. : 6,372,819 B1 
DATED : April 16, 2002
INVENTOR(S) : Mizobuchi et al.

It is certified that error appears in the above-identified patent and that said Letters Patent is hereby corrected as shown below:

Column 1,
Line 3, after "of" insert -- copending --.

Column 9,
Table 1, line 14, after "Example 1" insert -- (Sample #1-3) and from Example 2 (Control) --.

Signed and Sealed this

Tenth Day of December, 2002

JAMES E. ROGAN
*Director of the United States Patent and Trademark Office*